(12) United States Patent
Furukawa et al.

(10) Patent No.: US 11,040,773 B2
(45) Date of Patent: Jun. 22, 2021

(54) AERIAL SPRAYING APPARATUS, UNMANNED AERIAL VEHICLE SYSTEM, AND UNMANNED AERIAL VEHICLE

(71) Applicant: HONDA MOTOR CO., LTD., Tokyo (JP)

(72) Inventors: Jun Furukawa, Wako (JP); Yuji Ishitsuka, Wako (JP); Shinrak Park, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 16/140,616

(22) Filed: Sep. 25, 2018

(65) Prior Publication Data

US 2019/0106212 A1 Apr. 11, 2019

(30) Foreign Application Priority Data

Oct. 5, 2017 (JP) .............................. JP2017-195030

(51) Int. Cl.
*A62C 3/02* (2006.01)
*B64C 39/02* (2006.01)
(Continued)

(52) U.S. Cl.
CPC .............. *B64C 39/024* (2013.01); *B64D 1/18* (2013.01); *B65H 59/384* (2013.01); *B65H 75/425* (2013.01); *B65H 75/4484* (2013.01); *A62C 3/0242* (2013.01); *B64C 2201/12* (2013.01); *B64C 2201/148* (2013.01); *B65H 2701/34* (2013.01)

(58) Field of Classification Search
CPC ...... A62C 3/0242; B05B 13/005; B64D 1/18; B64D 1/16; B64C 2201/148; B64C 39/024; B64C 39/022; B64F 3/00; B64F 3/02
USPC ........................................................... 169/53
See application file for complete search history.

(56) References Cited

U.S. PATENT DOCUMENTS 3,381,922 A * 5/1968 Laing .................... B64C 39/022
244/136
3,759,330 A * 9/1973 Rainey ................. A62C 3/0242
169/47

(Continued)

FOREIGN PATENT DOCUMENTS

JP 2016-049864 4/2016
WO 2017/094842 6/2017

OTHER PUBLICATIONS

Kokotovic, Jamshidi, Optimal Tension Regulation of a Strip Winding Process, Jan. 1970, Coordinated Science Laboratory, University of Illinois—Urbana, Illinois, Report R-451 (Year: 1970).*

(Continued)

*Primary Examiner* — Joseph A Greenlund
(74) *Attorney, Agent, or Firm* — Amin, Turocy & Watson, LLP (57) ABSTRACT

An aerial spraying apparatus (unmanned aerial vehicle system) includes one or more drones (unmanned aerial vehicles), and a station on the ground that is connected by wire to at least one of the one or more drones. Each of the one or more drones is equipped with a drone side cable connected to the station or another drone, and a drone side cable mechanism that performs paying out or pulling in of the drone side cable.

18 Claims, 7 Drawing Sheets

(51) Int. Cl.
  *B64D 1/18*   (2006.01)
  *B65H 59/38*  (2006.01)
  *B65H 75/44*  (2006.01)
  *B65H 75/42*  (2006.01)

(56) References Cited

U.S. PATENT DOCUMENTS

| | | | | |
|---|---|---|---|---|
| 7,510,142 | B2* | 3/2009 | Johnson | B64C 39/022 |
| | | | | 244/17.11 |
| 10,011,352 | B1* | 7/2018 | Dahlstrom | B64C 39/024 |
| 10,150,562 | B2* | 12/2018 | Hein | B64C 39/022 |
| 10,392,103 | B2* | 8/2019 | Bourne | B64C 39/024 |
| 10,413,763 | B2* | 9/2019 | Won | B64C 39/02 |
| 10,535,986 | B2* | 1/2020 | Hundemer | B65H 75/4486 |
| 10,569,871 | B2* | 2/2020 | Chafe | B64C 31/06 |
| 2013/0134254 | A1* | 5/2013 | Moore | B64D 1/16 |
| | | | | 244/17.11 |
| 2013/0233964 | A1* | 9/2013 | Woodworth | G05D 1/104 |
| | | | | 244/2 |
| 2015/0041598 | A1* | 2/2015 | Nugent | B64C 39/022 |
| | | | | 244/53 R |
| 2015/0060090 | A1* | 3/2015 | Harris | A62C 3/0242 |
| | | | | 169/13 |
| 2016/0200437 | A1* | 7/2016 | Ryan | B64C 39/022 |
| | | | | 244/99.2 |
| 2017/0043872 | A1* | 2/2017 | Whitaker | B64D 1/18 |
| 2017/0190444 | A1* | 7/2017 | Hundemer | B64F 1/029 |
| 2018/0043386 | A1* | 2/2018 | Busby | B05B 9/007 |
| 2018/0207456 | A1* | 7/2018 | Katz | B05B 15/68 |
| 2018/0326441 | A1* | 11/2018 | Liu | B05B 15/62 |
| 2019/0106212 | A1* | 4/2019 | Furukawa | B64F 3/00 |
| 2019/0152577 | A1* | 5/2019 | Kim | B64B 1/70 |
| 2019/0160315 | A1* | 5/2019 | Head | G05D 1/0094 |
| 2019/0176987 | A1* | 6/2019 | Beecham | B64C 39/024 |
| 2019/0256207 | A1* | 8/2019 | Nohmi | B64C 27/08 |

OTHER PUBLICATIONS

Japanese Office Action for Japanese Patent Application No. 2017-195030 dated Oct. 20, 2020.

* cited by examiner

AERIAL SPRAYING APPARATUS, UNMANNED AERIAL VEHICLE SYSTEM, AND UNMANNED AERIAL VEHICLE

CROSS-REFERENCE TO RELATED APPLICATION

This application is based upon and claims the benefit of priority from Japanese Patent Application No. 2017-195030 filed on Oct. 5, 2017, the contents of which are incorporated herein by reference.

BACKGROUND OF THE INVENTION

Field of the Invention

The present invention relates to an unmanned aerial vehicle adapted to fly by being connected in a wired manner to a station on the ground, and further relates to an aerial spraying apparatus and an unmanned aerial vehicle system including such an unmanned aerial vehicle.

Description of the Related Art

For example, in U.S. Patent Application Publication No. 2017/0043872, an unmanned aerial firefighting system (aerial spraying apparatus) is disclosed in which a fire retardant is dispersed into the air using unmanned aerial vehicles (so-called drones) with respect to forest fires or the like. The aerial spraying apparatus connects a plurality of drones and a station on the ground with a cable, and supplies power from the station and the fire retardant to the drones via the cable. In accordance therewith, concerning the drones, adequate time for flying and performing the operations thereof is ensured.

Further, the plurality of drones that are disclosed in U.S. Patent Application Publication No. 2017/0043872 include a relay drone that movably supports the cable, and a spraying drone connected to an end of the cable and which disperses the fire retardant. In addition, concerning the aerial spraying apparatus, paying out or winding in of the cable thereof is carried out at the station, and further, due to the fact that the cable is held by a pulley of the relay drone, entanglement of the cable is prevented from occurring.

SUMMARY OF THE INVENTION

However, in this type of aerial spraying apparatus, even if the length of the cable is adjusted on the side of the station, there is a concern that the cable may not smoothly follow along with the displacement or the like of the relay drone or the spraying drone during flight. For example, the relay drone may be displaced, and in certain cases, the cable between the relay drone and the spraying drone may become lengthened and hang down (the cable may not be allocated properly). In this case, the possibility for the cable to become entangled with obstacles such as wires or trees or the drone itself increases. More specifically, in such a conventional aerial spraying apparatus, since the length of the cable is not adjusted, there is a problem in that the flight conditions and the spraying operation (dispersal of the fire retardant) cannot be carried out in a stable manner.

The present invention has been devised taking into consideration the aforementioned circumstances, and has the object of providing an aerial spraying apparatus, an unmanned aerial vehicle system, and an unmanned aerial vehicle in which, by enabling the length of a cable to be suitably adjusted, it is possible to carry out predetermined operations and flying in a stable manner.

In order to accomplish the above-described object, the present invention is characterized by an aerial spraying apparatus including one or more unmanned aerial vehicles adapted to fly in the air by remote operation or by automated piloting, and a station on the ground that is connected by wire to at least one of the one or more unmanned aerial vehicles, wherein the station includes a spraying agent supplying unit capable of supplying a spraying agent, and the one or more unmanned aerial vehicles comprises a cable connected to the station or another of the one or more unmanned aerial vehicles, a cable mechanism adapted to perform paying out or pulling in of the cable, and a spraying unit adapted to spray the spraying agent, wherein the at least one of the one or more unmanned aerial vehicles is connected to the station by the cable, the spraying agent is supplied from the spraying agent supplying unit to the one or more unmanned aerial vehicles via the cable, and the spraying agent is sprayed from the one or more unmanned aerial vehicles.

Further, the one or more unmanned aerial vehicles preferably includes a housing in which the cable is accommodated, and inside the housing, an unmanned aerial vehicle side internal connector is provided which is capable of being connected to the cable of the other unmanned aerial vehicle.

Furthermore, the one or more unmanned aerial vehicles preferably comprises a power supplying system connected to a power terminal provided in the unmanned aerial vehicle side internal connector, and adapted to distribute electrical power supplied from the station, a spraying agent system connected to a spraying agent terminal provided in the unmanned aerial vehicle internal connector, and adapted to spray by the spraying unit the spraying agent supplied from the station, and a communication system connected to a communication terminal provided in the unmanned aerial vehicle side internal connector, and adapted to carry out communications with the station.

Still further, inside the cable, there may be accommodated collectively an electrical power line connected to the power terminal, a spraying agent line connected to the spraying agent terminal, and a communication line connected to the communication terminal.

In this instance, an unmanned aerial vehicle side external connector, which is capable of being connected to the station or the other unmanned aerial vehicle, is preferably provided at a free end portion of the cable of the one or more unmanned aerial vehicles.

Furthermore, the one or more unmanned aerial vehicles may include an unmanned aerial vehicle side control device adapted to carry out a tension control for keeping a tension of the cable constant during paying out or pulling in of the cable by the cable mechanism.

In this case, a configuration can be provided in which the cable mechanism comprises a reel on which the cable is wound, and a motor adapted to rotate the reel, and during implementation of the tension control, the unmanned aerial vehicle side control device calculates an actual tension on the basis of a winding radius, a moment of inertia, and a frictional resistance of the reel, and a torque of the motor, and further controls driving of the motor by calculating a target current of the motor based on the actual tension and a target tension.

In addition, the station preferably includes a power supplying unit adapted to supply electrical power via the cable to the one or more unmanned aerial vehicles.

Still further, the station may include a station side external connector to which the cable is connected, and a height adjusting unit adapted to displace a height position of the station side external connector.

In addition to the above-described configuration, the station preferably further comprises a station side cable connected to the station side external connector, and a station side cable mechanism adapted to perform pulling in of at least the station side cable.

Furthermore, the height adjusting unit preferably includes an expanding/contracting pole having the station side external connector provided on an upper end portion thereof, and which is capable of being vertically expanded and contracted, and the station preferably includes a station side control device adapted to control an amount of expansion or contraction of the expanding/contracting pole.

In this case, the station side control device may perform a pulling in control to pull in the station side cable by the station side cable mechanism, depending on a contraction of the expanding/contracting pole.

Further still, the station preferably is constituted as a movable body that is capable of moving on the ground.

Further, in order to accomplish the above-described object, the present invention is characterized by an unmanned aerial vehicle system including one or more unmanned aerial vehicles adapted to fly in the air by remote operation or by automated piloting, and a station on the ground that is connected by wire to at least one of the one or more unmanned aerial vehicles, wherein the one or more unmanned aerial vehicles comprises a cable connected to the station or another of the one or more unmanned aerial vehicles, and a cable mechanism adapted to perform paying out or pulling in of the cable.

Furthermore, in order to accomplish the above-described object, the present invention is characterized by an unmanned aerial vehicle adapted to fly in the air by remote operation or by automated piloting, comprising a cable connected by wire with respect to a station on the ground or another unmanned aerial vehicle, and a cable mechanism adapted to perform paying out or pulling in of the cable.

According to the present invention, in the aerial spraying apparatus, the unmanned aerial vehicle system, and the unmanned aerial vehicle, the cable and the cable mechanism are provided in the unmanned aerial vehicle. Therefore, the unmanned aerial vehicle can fly suitably in the air and perform operations while being connected by wire to the station on the ground or to another unmanned aerial vehicle. For example, the unmanned aerial vehicle is capable of flying and performing operations over a prolonged time period by receiving electrical power, the spraying agent, and information, etc., from the station or another unmanned aerial vehicle via the cable. Further, when flying, the cable mechanism performs paying out or pulling in of the cable to thereby adjust the length of the cable. As a result, an influence due to the cable being extended over a long length (entanglement of the cable, contact with obstacles or the ground, load variations, or the like) is suppressed, and the unmanned aerial vehicle is capable of flying in a stable manner.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of the present invention will be presented and described in detail below with reference to the accompanying drawings.

Figure 1:
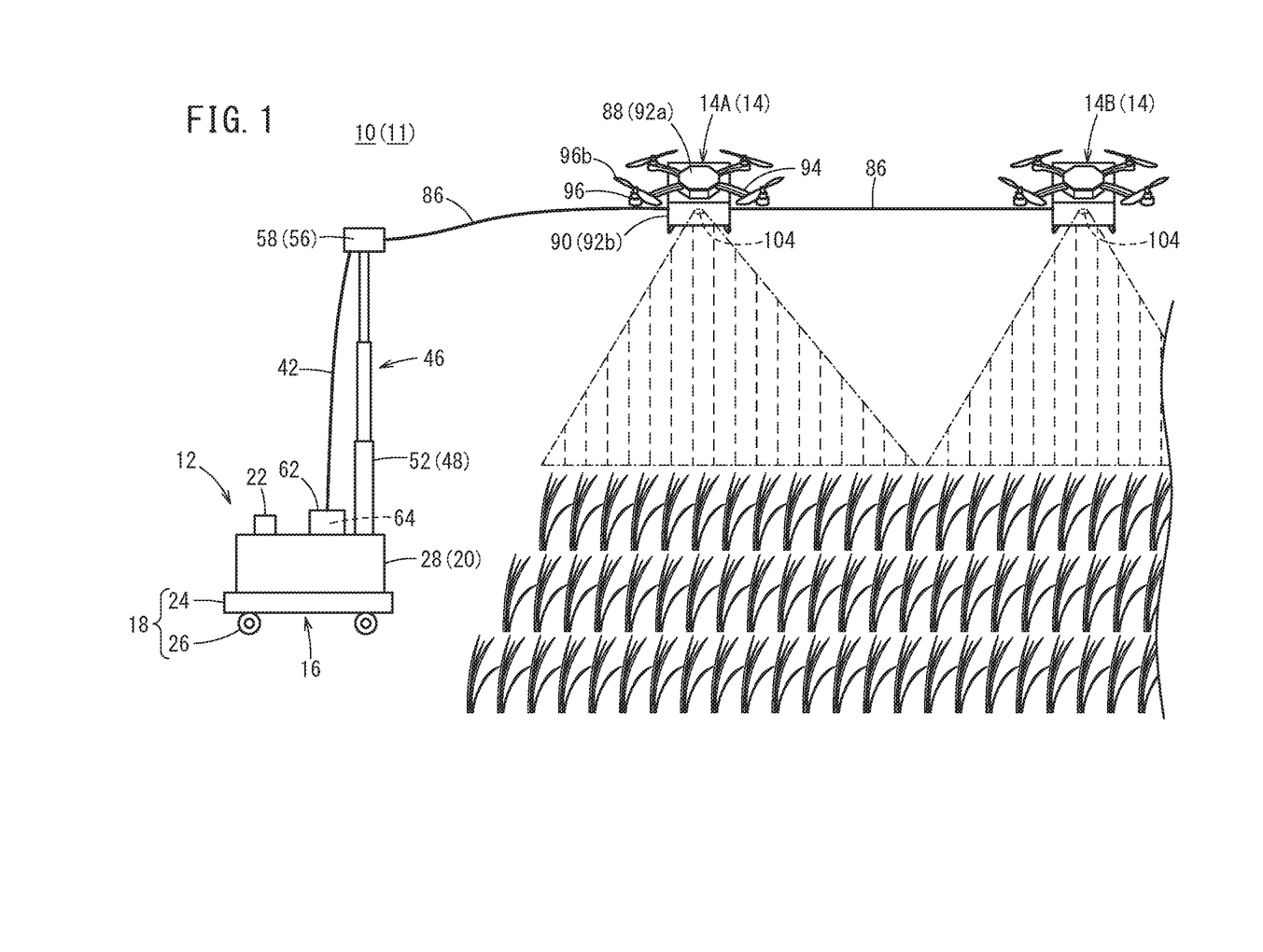
FIG. 1 is an explanatory diagram schematically showing an aerial spraying apparatus according to an embodiment of the present invention.

As shown in FIG. 1, an unmanned aerial vehicle system 10 according to an embodiment of the present invention is a system including a station 12 on the ground, and unmanned aerial vehicles 14 (hereinafter referred to as drones 14), and the station 12 and the drones 14 are used in a state of being mutually connected to each other by wire. More specifically, the unmanned aerial vehicle system 10 is configured as an aerial spraying apparatus 11, in which agricultural chemicals are supplied as a spraying agent from the station 12 to the drones 14, and the agricultural chemicals are sprayed from the air onto farmland (fields). Furthermore, in the aerial spraying apparatus 11, a plurality of drones 14 are connected by wire, whereby the aerial spraying apparatus 11 is capable of spraying the agricultural chemicals over a wide range.

The station 12 of the aerial spraying apparatus 11 is constituted as a supply source for supplying electrical power, agricultural chemicals, and information and the like to the drones 14. More specifically, the wired connection of the drones 14 brings about significant advantages, including a reduction in weight of the drones 14 themselves, securing of a sufficient cruising (flying) time by supplying power from the station 12, securing a time of operation by supplying the agricultural chemicals from the station 12, stabilization of information communications, and the like. Moreover, the unmanned aerial vehicle system 10 (aerial spraying apparatus 11) is not limited to a configuration in which the power source, the spraying agent, and the information are all supplied, but may be of a configuration in which at least one of the power source, the spraying agent, and the information is supplied by wire from the station 12.

Figure 2:
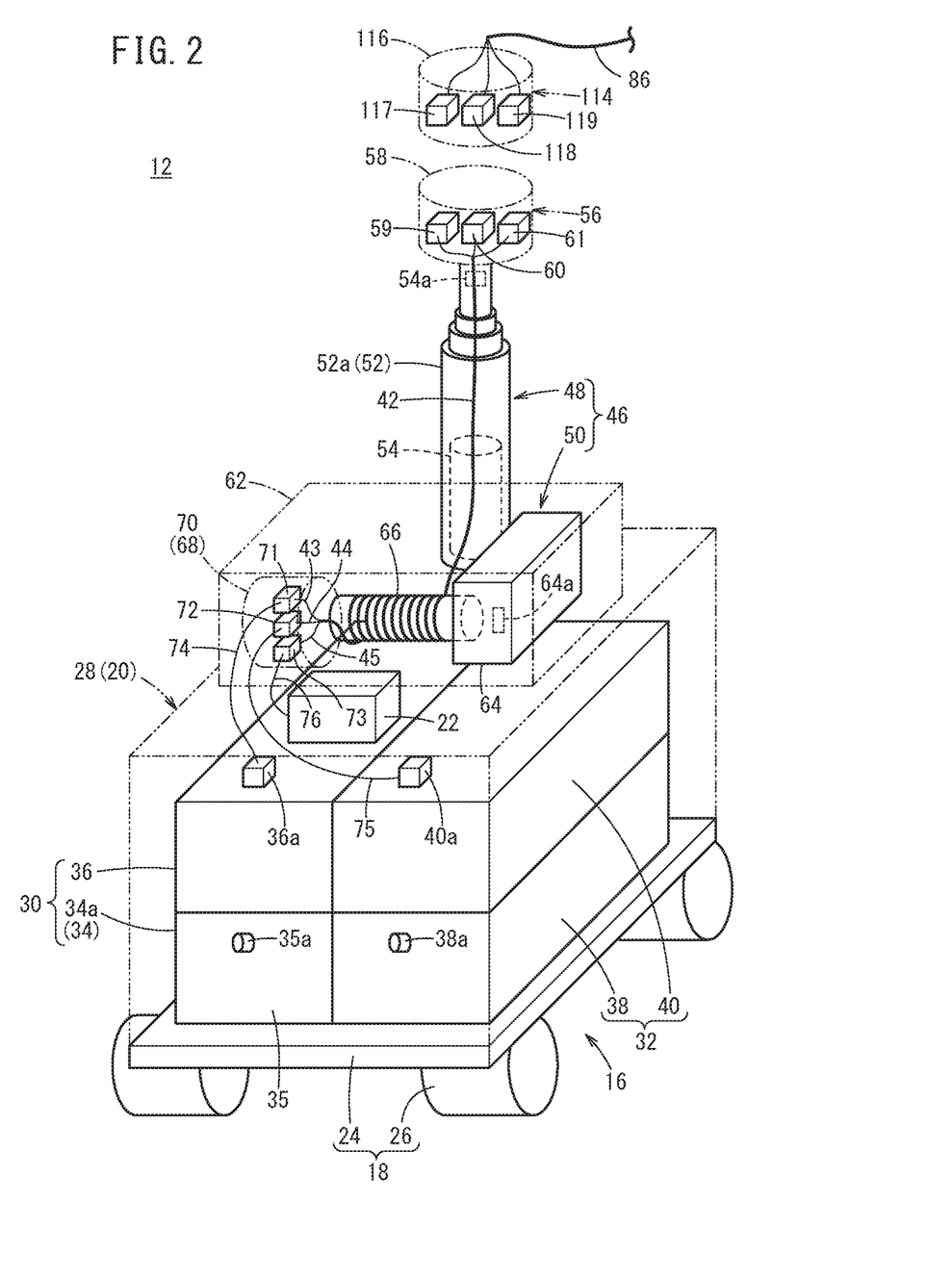
FIG. 2 is a perspective view schematically showing a station.

Further, the station 12 according to the present embodiment is constituted by a movable body 16 which is capable of traveling on the ground. In greater detail, as shown in FIG. 2, the station 12 includes a travel unit 18 by which traveling is implemented, a main body portion 20 mounted on the travel unit 18 and which performs actual supply of electrical power and agricultural chemicals, and a station side control device 22 that controls the operations of the station 12. The station side control device 22 is also an information supplying source that performs information communications with the drones 14, or stated otherwise, supplies information to the drones 14.

Figure 3:
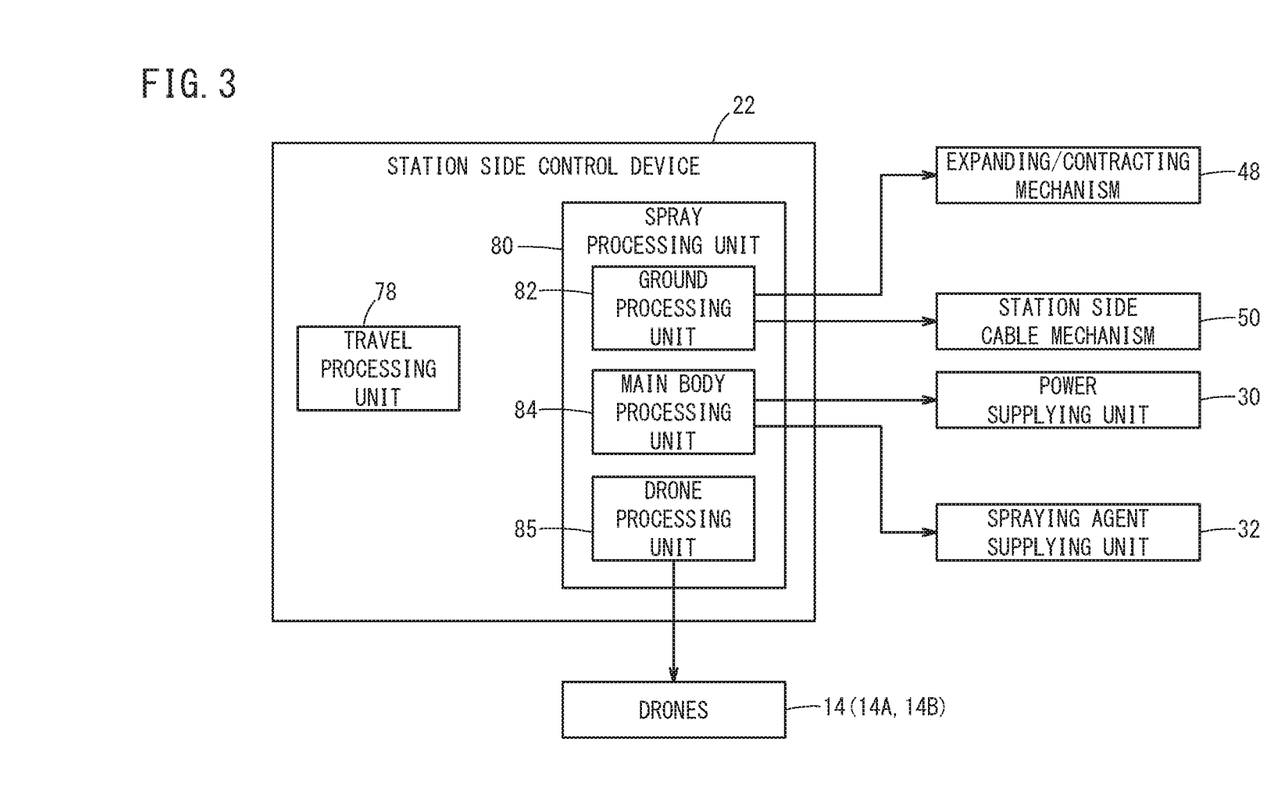
FIG. 3 is a functional block diagram of a station side control device.

The travel unit 18 is capable of performing autonomous traveling under the control of the station side control device 22 (travel processing unit 78, see FIG. 3). The travel unit 18 includes a base 24, a plurality of wheels 26 provided on a lower side of the base 24, a non-illustrated engine (power device) that causes predetermined ones of the wheels 26 to rotate, a non-illustrated steering device for steering predetermined ones of the wheels 26, and a non-illustrated station side camera for capturing images of the surrounding environment.

For example, the station 12 is disposed at the side (along a footpath) of farmland onto which spraying is planned when agricultural chemicals are to be sprayed. In addition, during such spraying, the station side control device 22 drives the power device and the steering device in accordance with a spraying range or a travel route for the agricultural chemicals that has been set by the user, the surrounding environment whose image was captured by the station side camera, the positions of the drones 14, and the like. Consequently, the station 12 displaces the position of the supply source at the side of the farmland during spraying, and supports the state of the wired connection with the drones 14. Concerning the manner of moving the travel unit 18, any known technique may be applied, and thus, detailed description of this feature is omitted.

The structure of the travel unit 18 is not limited to the configuration described above, and for example, a caterpillar or the like may be applied thereto instead of the wheels 26, and further, a motor or the like may be applied as the power device. Furthermore, the station 12 may be configured so as to travel under operations of a user, and not by way of autonomous traveling. Alternatively, the station 12 may be mounted on a vehicle (not shown) or the like which is another type of movable body, and may be moved by being driven by a user or by way of autonomous traveling.

The main body portion 20 of the station 12 includes a box-shaped housing 28 that is fixed on the base 24 of the travel unit 18. A power supplying unit 30 and a spraying agent supplying unit 32 are disposed in the interior of the housing 28. The power supplying unit 30 includes a generator 34a or a battery (not shown) which serves as a power source 34, and an electrical equipment unit 36 that controls the electrical power state of the generator 34a or the battery. The spraying agent supplying unit 32 includes a storage tank 38 which serves as a supply source of the agricultural chemicals, and a station side pump 40 that carries out supply of the agricultural chemicals with an appropriate discharge amount and discharge pressure. Further, the main body portion 20 includes a station side cable 42 through which transmission of power, flowing of the agricultural chemicals, and communication of information to the exterior of the station 12 are carried out.

The station side cable 42 includes a cylindrical covering portion (not shown) made of an insulating resin material, and accommodates an electrical power line 43, a spraying agent line 44, and a communication line 45 in the interior of the covering portion. The electrical power line 43 is a power supplying cable constituted from a conductor. The spraying agent line 44 is a hose that possesses appropriate flexibility and rigidity, and includes a hollow space in the interior thereof. The communication line 45, in the same manner as the electrical power line 43, is a conductor that is capable of executing signal transmission. The electrical power line 43, the spraying agent line 44, and the communication line 45 extend in parallel inside the covering portion along the direction in which the station side cable 42 extends. The electrical power line 43 and the communication line 45 may also be constituted by a single power supplying cable.

A known type of device can be applied to the generator 34a (power source 34), and preferably, one having a long continuous operation time (power generation time) is used. For example, the generator 34a includes a fuel tank 35 in which a fuel is stored, together with an internal combustion engine that obtains a rotational driving force by combustion of the fuel that is supplied from the fuel tank 35, and an alternator that converts the rotational driving force into electrical power (neither of which are illustrated). Further, the fuel tank 35 of the generator 34a includes a replenishing port 35a at an appropriate location, and in the case that power generation is executed for a prolonged time period, fuel can be replenished into the fuel tank 35 via the replenishing port 35a using a hose, a fuel can, or the like.

In the case that the power source 34 is the generator 34a, concerning the electrical equipment unit 36, an AC/DC converter is applied thereto, which converts AC power from the generator 34a into DC power. For example, such an AC/DC converter converts an AC voltage of 100 V into a DC voltage of 400 V or greater. Alternatively, in the case that the power source 34 is a battery, concerning the electrical equipment unit 36, a DC/DC converter is applied thereto, which converts the DC voltage of the battery into an appropriate voltage. Moreover, the electrical equipment unit 36 may employ various configurations (for example, a regulator or the like) which can suitably control the state in which electrical power is supplied.

Concerning the storage tank 38 of the spraying agent supplying unit 32, a container capable of storing an optimum amount of agricultural chemicals may be used therefor, on the basis of a spraying amount per unit area of the agricultural chemicals, the spraying area, or the like. Moreover, the storage tank 38 also includes a replenishing port 38a, and in the case that the agricultural chemicals are sprayed over a prolonged time period, the agricultural chemicals may be replenished via the replenishing port 38a using a hose, a can for the agricultural chemicals, or the like.

The station side pump 40 applies pressure to the agricultural chemicals stored inside the storage tank 38, and causes the agricultural chemicals to flow out into the station side cable 42. Under the control of the station side control device 22, the station side pump 40 can appropriately adjust the outflowing condition (the amount and rate of outflow) of the agricultural chemicals.

Further, the station 12 (main body portion 20) according to the present embodiment includes a height adjusting unit 46 which adjusts a connection height position, in a manner so that cables (drone side cables 86) extend between the station 12 and the drones 14 at a desired height. In accordance with this feature, the drone side cables 86 are inhibited from coming into contact with the ground surface. The height adjusting unit 46 includes an expanding/contracting mechanism 48 which is capable of being expanded and contracted in a vertical direction, and a station side cable mechanism 50 that performs pulling in of the station side cable 42.

The expanding/contracting mechanism 48 includes an expanding/contracting pole 52 configured by sequentially accommodating a plurality of cylindrical bodies 52a of different thicknesses from the outside toward the inside, and an expansion/contraction actuator 54 that carries out expansion and contraction operations of the expanding/contracting pole 52.

The expanding/contracting pole 52 is constituted by a telescoping type of pole in which a plurality of cylindrical bodies 52a move relative to each other. The expanding/contracting pole 52 is fixed in a manner so that an outermost cylindrical body 52a thereof is erected with respect to the upper surface of the housing 28 (or the base 24), and the other cylindrical bodies 52a thereof are displaced in the height direction (are made to extend in an upward direction, and to contract in a downward direction from the extended state) by the expansion/contraction actuator 54. In addition, a station side external connector 56 for the purpose of connecting the drone side cable 86 to the station 12 (station side cable 42) is provided on an upper end of the expanding/contracting pole 52. Moreover, in FIGS. 1 and 2, a configuration is shown in which the station side cable 42 is exposed to the exterior, however, the station side cable 42 may be accommodated inside the expanding/contracting pole 52.

The station side external connector 56 includes a disk-shaped external connection housing 58, and a power terminal 59, a spraying agent terminal 60, and a communication terminal 61 to which the electrical power line 43, the spraying agent line 44, and the communication line 45 of the station side cable 42 are respectively connected are provided inside the external connection housing 58. For example, concerning the power terminal 59 and the communication terminal 61, a known type of connection plug having a water resistant property can be applied thereto, and further, concerning the spraying agent terminal 60, a joint for connecting a hose can be applied thereto.

Concerning the expansion/contraction actuator 54, for example, a hydraulic cylinder is applied thereto. The expansion/contraction actuator 54 adjusts or maintains the total length of the expanding/contracting pole 52 by driving a non-illustrated driver device to which control instructions have been imparted from the station side control device 22. Further, a height detector 54a, which detects the amount of expansion or contraction of the expanding/contracting pole 52 (for example, detects a hydraulic pressure state of the aforementioned hydraulic cylinder), is provided in the expansion/contraction actuator 54.

The station side cable mechanism 50 is constituted as an electric reel which is capable of winding in (pulling in) the station side cable 42, and is accommodated inside a holder 62 provided at the upper part of the housing 28. More specifically, the height position of the station side external connector 56, which is disposed at the upper end of the expanding/contracting pole 52, changes accompanying the expansion and contraction of the expanding/contracting pole 52. Therefore, the station side cable 42 that is connected to the station side external connector 56 is pulled out accompanying elongation of the expanding/contracting pole 52. In addition, upon contraction of the expanding/contracting pole 52, the station side cable mechanism 50 winds in (performs a pulling-in control of) the station side cable 42 in order to prevent entanglement. More specifically, the station side cable mechanism 50 includes a station side motor 64, a station side reel 66, and a station side internal connector 68.

The station side motor 64 includes a non-illustrated rotary shaft connected to the station side reel 66, and a rotational operation of the rotary shaft is controlled under a control of the station side control device 22. Controls implemented by the station side control device 22 will be described later.

The station side reel 66 is constituted in a cylindrical shape that extends a predetermined length in the axial direction, is freely rotatable in a normal state, and further rotates by receiving a rotational driving force from the station side motor 64. For example, as described above, at a time that the expanding/contracting pole 52 is elongated, the station side reel 66 is rotated accompanying pulling out of the station side cable 42, and smoothly pays out the station side cable 42 that is wound thereon. On the other hand, when the expanding/contracting pole 52 is contracted, the station side reel 66 is rotated in a direction opposite to that at the time of paying out, and the station side cable 42 is wound around the outer circumferential surface thereof. Moreover, although not illustrated, flanges may be provided at both ends in the axial direction of the station side reel 66 in order to prevent disengagement of the cable. Further, at a position in the vicinity of the station side reel 66, a guide member preferably is provided for guiding a winding position of the cable in the axial direction.

The station side internal connector 68 is provided at a projecting end of the station side reel 66, and rotatably supports the station side reel 66. The station side internal connector 68 includes a disk-shaped internal connection housing 70, and is further equipped with a power terminal 71, a spraying agent terminal 72, and a communication terminal 73 on one end surface of the internal connection housing 70. The electrical power line 43, which is exposed from the station side cable 42, is connected to the power terminal 71, the spraying agent line 44, which is exposed from the station side cable 42, is connected to the spraying agent terminal 72, and the communication line 45, which is exposed from the station side cable 42, is connected to the communication terminal 73.

An end connector (not shown) of an electrical power line 74 inside the main body portion 20 is connected to the power terminal 71, and the electrical power line 74 is connected to a power terminal 36a of the electrical equipment unit 36. An end connector (not shown) of a spraying agent line 75 (hose) inside the main body portion 20 is connected to the spraying agent terminal 72, and the spraying agent line 75 is connected to an outflow port 40a of the station side pump 40. An end connector (not shown) of a communication line 76 is connected to the communication terminal 73, and the communication line 76 is connected to an input/output interface (not shown) of the station side control device 22.

Due to the fact that the station side cable 42 rotates integrally with the station side reel 66, the electrical power line 43, the spraying agent line 44, and the communication line 45 also rotate along therewith. Therefore, the power terminal 71, the spraying agent terminal 72, and the communication terminal 73 are configured with rotatable structures so as to enable the supply of electrical power, the flow of the spraying agent, and communication of information. For example, a slip ring mechanism or the like, which permits rotation while maintaining the state of contact with the terminals of the electrical power line 43 and the terminals of the communication line 45, is applied to the power terminal 71 and the spraying agent terminal 72. Further, for example, concerning the spraying agent terminal 72, a rotating mechanism is applied thereto that rotatably supports a rotating pipe (not shown), which is fixed to the station side reel 66 and communicates with the spraying agent line 44 of the station side cable 42. In addition, the rotating pipe and the flow path of the spraying agent line 75 are placed in communication so that the spraying agent flows therethrough.

As shown in FIGS. 1 and 2, the station side control device 22 is configured as a management device that controls the aerial spraying apparatus 11 (unmanned aerial vehicle system 10) as a whole. A well-known type of computer having a processor, a memory, and an input/output interface, none of which are shown, is applied to the station side control device 22. In addition to the above-described communication line 76, a touch panel (input/output device) or the like for inputting of information by an operator, and for providing information to the operator is connected to the input/output interface. In addition, the station side control device 22 makes up a functional unit, as shown in FIG. 3, by a processor carrying out an execution process of programs stored in a memory (not shown).

More specifically, in the interior of the station side control device 22, there are provided a travel processing unit 78 that performs autonomous traveling of the travel unit 18, and a spray processing unit 80 that performs a process of spraying the agricultural chemicals. Further, in the interior of the spray processing unit 80, there are constructed a ground processing unit 82 that controls the height adjusting unit 46, a main body processing unit 84 that controls the power supplying unit 30 and the spraying agent supplying unit 32, and a drone processing unit 85 that provides various instructions to the drones 14.

The ground processing unit 82 appropriately operates the expanding/contracting mechanism 48 and the station side cable mechanism 50, on the basis of the height of the drones 14 in a state of flight, images of the surrounding environment captured by the station side camera, setting operations performed by the operator, and the like.

For example, on the basis of the spraying range and the spraying amount, which are set by the operator, the spray processing unit 80 sets a height position and a movement path over which the drones 14 fly. The ground processing unit 82 calculates the amount of expansion or contraction of the expanding/contracting pole 52 in accordance with the height of the drones 14, and instructs the expansion/contraction actuator 54 to be driven based on the amount of expansion or contraction. Further, the ground processing unit 82 adjusts the height of the expanding/contracting pole 52 when obstacles (utility poles, electric wires, trees, etc.) are extracted from the surrounding environment that is photographed by the station side camera. Alternatively, the ground processing unit 82 may process content that is manipulated by the operator in real time, and thereby carry out expansion or contraction of the expanding/contracting pole 52.

At a time that the expanding/contracting pole 52 is elongated, the station side cable 42, which is wound around the station side reel 66, is paid out, accompanied by the station side reel 66 also being rotated. In addition, accompanying contraction of the expanding/contracting pole 52, the ground processing unit 82 drives and controls the station side motor 64, and thereby performs winding in (performs a pulling in control) of the station side cable 42.

In greater detail, the ground processing unit 82 calculates a height h of the expanding/contracting pole 52 on the basis of a signal from the height detector 54a. Additionally, based on the height h of the expanding/contracting pole 52 and the following expressions (1) and (2), a target length $l_{cmd}$ of the station side cable 42 is calculated.

$$l_{cmd}=h+\alpha \quad (1)$$

$$\alpha=\alpha_{base}+\alpha_{corr} \quad (2)$$

In the above expressions, $\alpha$ represents a margin of the station side cable 42, $\alpha_{base}$ is a value that can be set by the operator, and $\alpha_{corr}$ is a value calculated based on a speed of contraction dh/dt of the expanding/contracting pole 52.

Furthermore, using the target length $l_{cmd}$, the ground processing unit 82 calculates a target rotational speed $Rev_{cmd}$ and a target position $Pos_{cmd}$ of the station side motor 64 by the following expressions (3) and (4).

$$Rev_{cmd}=Ceil(l_{cmd}/2\pi r) \quad (3)$$

$$Pos_{cmd}=(l_{cmd}/2\pi r - Rev_{cmd})\times 2\pi r \quad (4)$$

More specifically, equation (3) is a formula for extracting only an integer part by a Ceil function, and equation (4) is a formula to convert the decimal part into radians [rad].

In addition, based on the calculated target rotational speed $Rev_{cmd}$ and the calculated target position $Pos_{cmd}$, the ground processing unit 82 instructs a non-illustrated driver device of the station side cable mechanism 50 to rotate the station side motor 64. Consequently, the station side motor 64 rotates.

Figure 4:
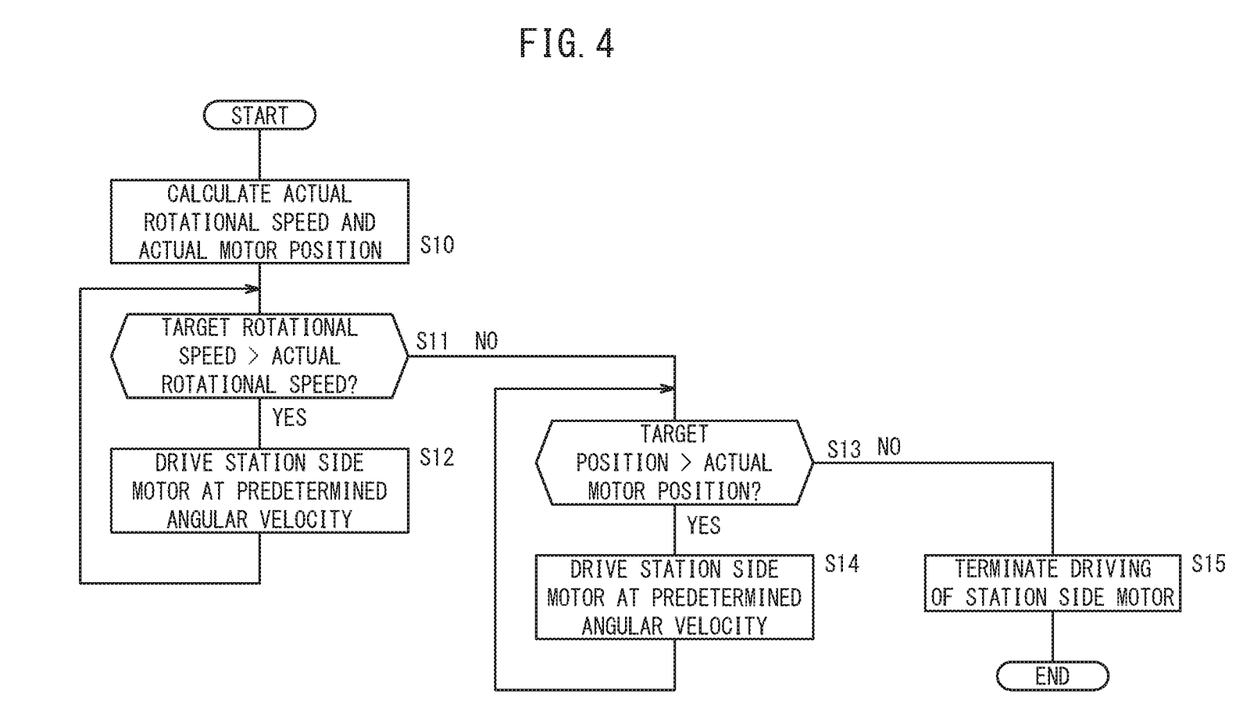
FIG. 4 is a flowchart at the time of a pulling in control of a station side cable.

Further, at the time of winding, the ground processing unit 82 receives a signal from a station side encoder 64a provided in the station side motor 64, and monitors the rotation of the station side motor 64. As shown in FIG. 4, during monitoring (the pulling in control), based on the signal from the station side encoder 64a, the ground processing unit 82 calculates an actual rotational speed $Rev_{act}$, and an actual motor position $Pos_{act}$ (step S10).

Next, a target rotational speed $Rev_{cmd}$ is compared with the actual rotational speed $Rev_{act}$ (step S11). In addition, in the case that the actual rotational speed $Rev_{act}$ is less than the target rotational speed $Rev_{cmd}$, the station side motor 64 is driven at a predetermined angular velocity $\omega_{cmd}$ (step S12). After step S12, the process returns to step S11, and the same process is repeated until the actual rotational speed $Rev_{act}$ becomes greater than or equal to the target rotational speed $Rev_{cmd}$.

On the other hand, in the case that the actual rotational speed $Rev_{act}$ is greater than or equal to the target rotational speed $Rev_{cmd}$, the target position $Pos_{cmd}$ and the actual motor position $Pos_{act}$ are compared (step S13). In addition, in the case that the actual motor position $Pos_{act}$ is less than the target position $Pos_{cmd}$, as expected, the station side motor 64 is driven at the predetermined angular velocity $\omega_{cmd}$ (step S14). After step S14 as well, the process returns to step S13, and the same process is repeated until the actual motor position $Pos_{act}$ becomes greater than or equal to the target position $Pos_{cmd}$.

In addition, in the case that the actual motor position $Pos_{act}$ is greater than or equal to the target position $Pos_{cmd}$, driving of the station side motor 64 is terminated (step S15). More specifically, at a stage at which the actual motor position $Pos_{act}$ has exceeded the target position $Pos_{cmd}$, the actual length of the station side cable 42 extending from the station side reel 66 becomes the target length $l_{cmd}$, and a state is brought about in which the station side cable 42 is wound in a suitable manner on the station side reel 66.

Returning to FIG. 3, the main body processing unit 84 sets an electrical power and an amount of the agricultural chemicals to be supplied to the drones 14 that are connected to the station 12. For example, as the number of connections of the drones 14 increases, the main body processing unit 84 carries out settings in order to supply electrical power and the agricultural chemicals in a stepwise manner. Further, concerning the supply of agricultural chemicals, the supply timing and the supplied amount may be adjusted in accordance with the state of the drones 14 (attitude during flying, position during flying, fault conditions, or the like).

The main body processing unit 84 outputs drive signals based on the set supplied amount of electrical power to the power supplying unit 30 (the generator 34a and the electrical equipment unit 36), whereby the power supplying unit 30 supplies an appropriate amount of electrical power to the drones 14. Further, by the main body processing unit 84 outputting drive signals to the spraying agent supplying unit 32 (station side pump 40) on the basis of the set amount of agricultural chemicals to be supplied, the spraying agent supplying unit 32 supplies the agricultural chemicals at an appropriate supply pressure.

Further, the drone processing unit 85 is a functional unit for instructing a flight content, etc., of the drones 14 at the time that the agricultural chemicals are sprayed. Basically, concerning the flight attitude of the drones 14, the flight attitude is autonomously controlled by flight control devices 98 provided inside the drones 14, however, the flight positions (direction of flight, flying speed, height, etc.) thereof are set on the basis of transmitted information that is transmitted from the station side control device 22. Stated otherwise, in the drones 14 according to the present embodiment, the flight positions thereof during spraying are adjusted by remote operations from the station side control device 22. Moreover, the drones 14 may be configured in a manner so as to have flight plan information stored therein beforehand, and to perform automated piloting on the basis of the flight plan information.

Figure 5:
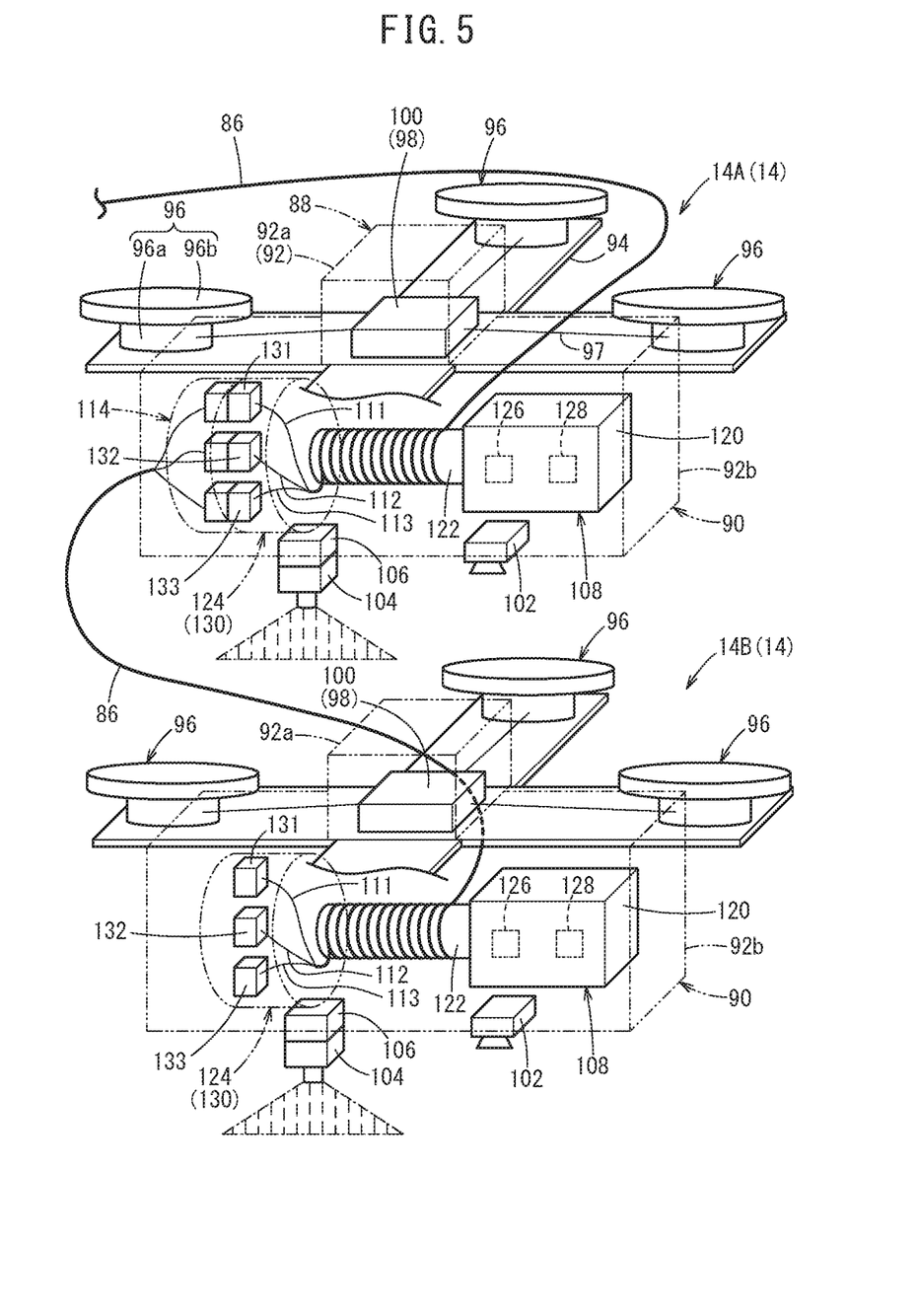
FIG. 5 is a perspective view schematically showing a first drone and a second drone.

Next, with reference to FIGS. 1 and 5, a description will be given concerning the drones 14 of the aerial spraying apparatus 11. In the aerial spraying apparatus 11, a plurality of the drones 14 (two as shown in FIG. 1) fly in formation while spraying the agricultural chemicals. Basically, the plurality of drones 14 are identical products having the same configuration, each of which includes a drone side cable 86 which is connected by wire to the station 12 or to another drone 14.

In the present embodiment, the plurality of drones 14 include a first drone 14A, which is directly connected to the station 12, and a second drone 14B, which is connected to the first drone 14A (is not connected directly to the station 12). The number of drones 14 that are used is not particularly limited, and may be appropriately prepared by the operator in accordance with a range over which the agricultural chemicals are to be sprayed or the like.

More specifically, each of the drones 14 is composed of a first structural portion 88 having a configuration primarily concerned with flying, and a second structural portion 90 having a configuration primarily concerned with spraying of the agricultural chemicals. The first and second structural portions 88, 90 include housings 92 (first and second housings 92a, 92b) in which the respective principal parts thereof are enclosed. The second housing 92b is connected and fixed to a lower portion of the first housing 92a.

The first structural portion 88 includes four arms 94 extending outwardly in radial directions from the first housing 92a, and four propeller mechanisms 96 provided at extended end portions of the respective arms 94. The flight control device 98 and a flying electrical equipment unit 100 are accommodated inside the first housing 92a. In FIG. 5, in order to facilitate understanding, illustration of the arms 94 and the propeller mechanisms 96 that project out toward the front of the sheet is omitted. Further, the first structural portion 88 includes non-illustrated detectors (a GPS sensor, a gyro sensor, an atmospheric pressure sensor, etc.) which are used during flying of the drones 14.

The four arms 94 are connected to side surfaces of the first housing 92a and extend at equal intervals (at intervals of 90°) from each other with the first housing 92a serving as a base point, and the extended ends thereof are located at the same height position.

The four propeller mechanisms 96 include propeller motors 96a, and propellers 96b that are rotated by the propeller motors 96a to thereby generate a levitating force. The propeller motors 96a are fixed to the extended end portions of the arms 94, and rotate non-illustrated rotary shafts to which the propellers 96b are fixed. Propeller electrical wiring 97 is connected to the propeller motors 96a. The propeller electrical wiring 97 passes through the interior of the arms 94, and is connected to the flying electrical equipment unit 100 inside the first housing 92a. The propeller motors 96a carry out rotational driving of the propellers 96b by supplying an appropriate electrical power from the flying electrical equipment unit 100 under the control of the flight control device 98.

Based on the direction of rotation and the rotational speed of the propellers 96b, the drones 14 obtain a lift force and fly in the air by generating a pressure difference about the totality of the four propellers 96b. Further, by changing the rotational speed of each of the propellers 96b and generating a difference in the lift force thereof, the drones 14 undergo movement and turning in the front, rear, left, and right directions.

The flight control device 98 controls rotation of each of the propellers 96b on the basis of the transmitted information received from the station side control device 22, and signals from the GPS sensor, the gyro sensor, and the atmospheric pressure sensor, etc. Further, the flying electrical equipment unit 100 has a DC to DC converter that converts a high voltage into a low voltage. Based on an instruction from the flight control device 98, the flying electrical equipment unit 100 supplies instructed power amounts to each of the four propeller mechanisms 96.

On the other hand, a drone side camera 102 for capturing images in a predetermined direction of the drone 14 (mainly downward), and a drone side pump 104 (spraying unit) for spraying the agricultural chemicals are attached to the second housing 92b of the second structural portion 90. Further, a sub-tank 106 for temporarily storing the agricultural chemicals, a drone side cable mechanism 108 which has a drone side internal connector 124, and together therewith, adjusts the length of the drone side cable 86, and a drone side control device 110 (unmanned aerial vehicle side control device, see FIG. 6), which performs processing at a time that the agricultural chemicals are sprayed, are disposed in the interior of the second housing 92b.

In the drones 14, the drone side cables 86 are paid out from a predetermined position of the second housing 92b (for example, a side surface oriented perpendicularly with respect to an upper surface connected to the first housing 92a). In the same manner as the station side cable 42, the drone side cables 86 include in the interior thereof an electrical power line 111, a spraying agent line 112, and a communication line 113. A drone side external connector 114 for connection to the station side external connector 56 or the other drone 14 may be provided at an extended end portion (an end portion opposite to the end portion connected to the drone side reel 122) of the drone side cable 86 (refer also to FIG. 2).

For example, as shown in FIG. 2, the drone side external connector 114 includes a disk-shaped connection housing 116 corresponding to the external connection housing 58 of the station side external connector 56. A power terminal 117 to which the electrical power line 111 is connected, a spraying agent terminal 118 to which the spraying agent line 112 is connected, and a communication terminal 119 to which the communication line 113 is connected are provided in the interior of the connection housing 116. The drone side external connector 114 preferably is constituted in a manner so that, by carrying out docking in which an end surface of the connection housing 116 and an end surface of the external connection housing 58 are placed in facing relation with the phases thereof in mutual alignment, the same types of terminals are automatically connected to each other. Consequently, preparations at the work site can be performed efficiently.

Returning to FIG. 5, the drone side camera 102 captures images of the environment surrounding the drone 14 during flight of the drone 14 or the like, and transmits the surrounding environment to the station side control device 22 and the drone side control device 110.

The drone side pump 104 sprays the agricultural chemicals in a downward direction of the drones 14. The agricultural chemicals are supplied temporarily into the sub-tank 106 via the drone side cable 86 (spraying agent line 112), and the drone side pump 104 draws in the agricultural chemicals that are stored in the sub-tank 106, and discharges the agricultural chemicals over a suitable spraying range that has been set. The type of pump is not particularly limited, but for example, an electromagnetic type poppet valve may be applied thereto having a solenoid valve 104a (see FIG. 6).

On the other hand, concerning the drone side cable mechanism 108, the same configuration can be applied thereto as that of the station side cable mechanism 50. Therefore, a drone side motor 120, a drone side driver device (not shown), a drone side reel 122, and a drone side internal connector 124 (unmanned aerial vehicle side internal connector) are disposed in the interior of the second structural portion 90.

More specifically, the drone side motor 120 carries out rotation (forward rotation and reverse rotation) of the drone side reel 122 under the control of the drone side control device 110. For example, accompanying forward rotation, the drone side reel 122 pays out the drone side cable 86 that is wound around the outer peripheral surface thereof, whereas accompanying reverse rotation, the drone side cable 86 is wound onto the outer peripheral surface. Further, an encoder 126 for detecting the rotational speed of the rotary shaft (drone side reel 122), and a current meter 128 for detecting the current supplied to the drone side motor 120 are provided in the drone side motor 120.

The drone side internal connector 124 rotatably supports the drone side reel 122 at a projecting end of the drone side reel 122. A power terminal 131 to which the electrical power line 111 of the drone side cable 86 is connected, a spraying agent terminal 132 to which the spraying agent line 112 of the drone side cable 86 is connected, and a communication terminal 133 to which the communication line 113 of the drone side cable 86 is connected are provided in an internal connection housing 130 of the drone side internal connector 124. The rotary connection structures in the power terminal 131, the spraying agent terminal 132, and the communication terminal 133 are configured in the same manner as in the station side internal connector 68.

Figure 6:
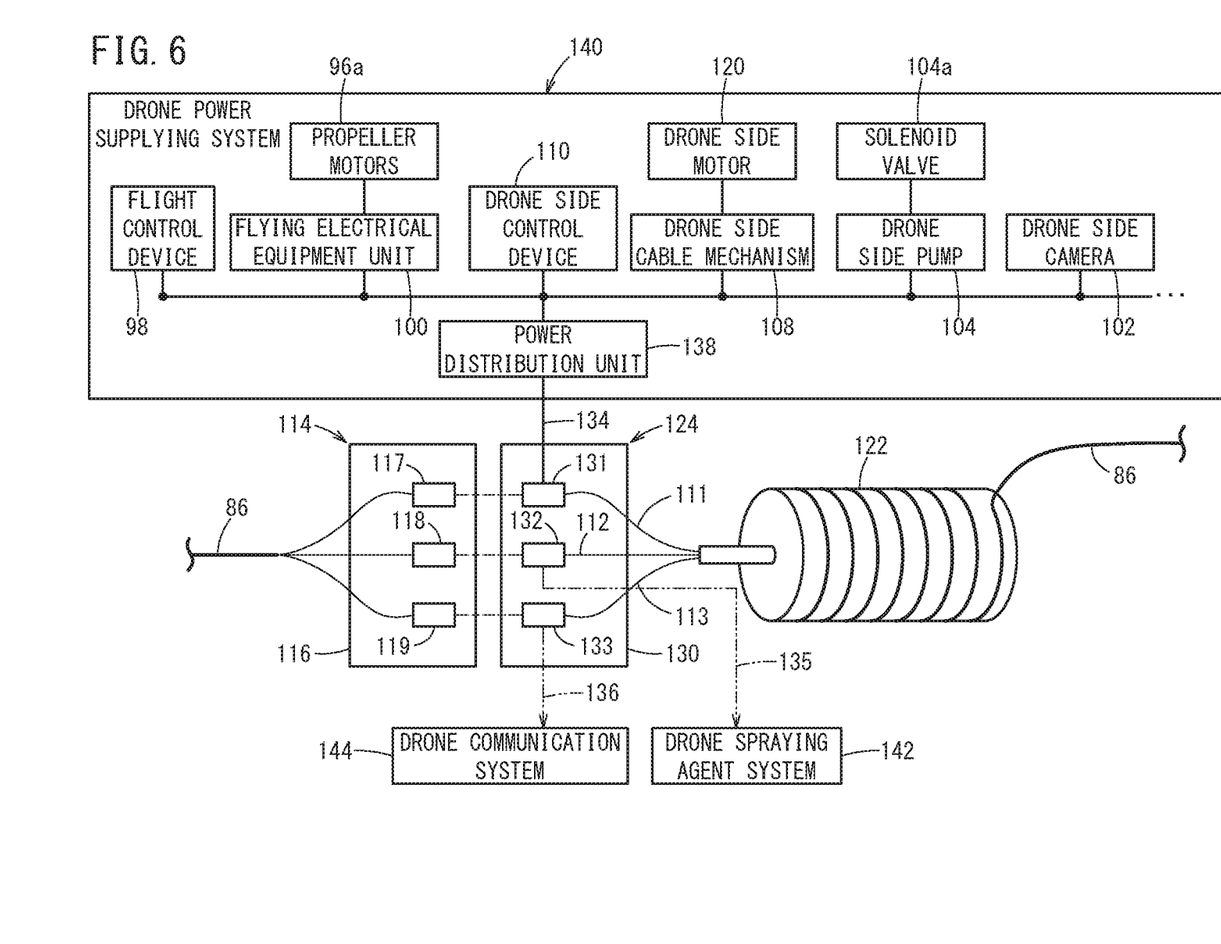
FIG. 6 is an explanatory view showing a drone power supplying system, and connections between connectors inside a drone.

As shown in FIG. 6, the drone side internal connector 124 is docked to the drone side external connector 114 of the other drone 14 (the second drone 14B in the case of the first drone 14A). Consequently, the power terminal 131, the spraying agent terminal 132, and the communication terminal 133 of the drone side internal connector 124 are connected respectively to the power terminal 117, the spraying agent terminal 118, and the communication terminal 119 of the drone side external connector 114.

Further, the power terminal 131 is also connected to a drone power supplying system 140 which supplies power to the respective configurations thereof via an electrical power line 134 inside the drone 14. The spraying agent terminal 132 is also connected to a drone spraying agent system 142 which stores and sprays the agricultural chemicals via a spraying agent line 135 inside the drone 14. The communication terminal 133 is also connected to a drone communication system 144 which carries out information communications via a communication line 136 inside the drone 14.

The drone power supplying system 140 carries out supply of electrical power to the components that are operated by electrical power inside the drone 14, and includes a power distribution unit 138 connected to the electrical power line 134. In addition, for example, the flight control device 98, the flying electrical equipment unit 100, the drone side control device 110, the drone side cable mechanism 108, the drone side pump 104, and the drone side camera 102, etc., are connected to the power distribution unit 138, and are supplied with an appropriate amount of electrical power that is supplied from the station 12.

Figure 7A:
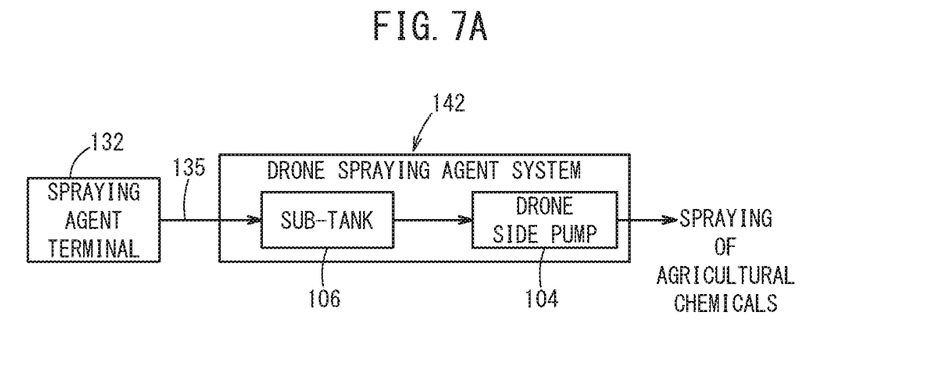
FIG. 7A is a block diagram illustrating a drone spraying agent system.
Figure 7B:
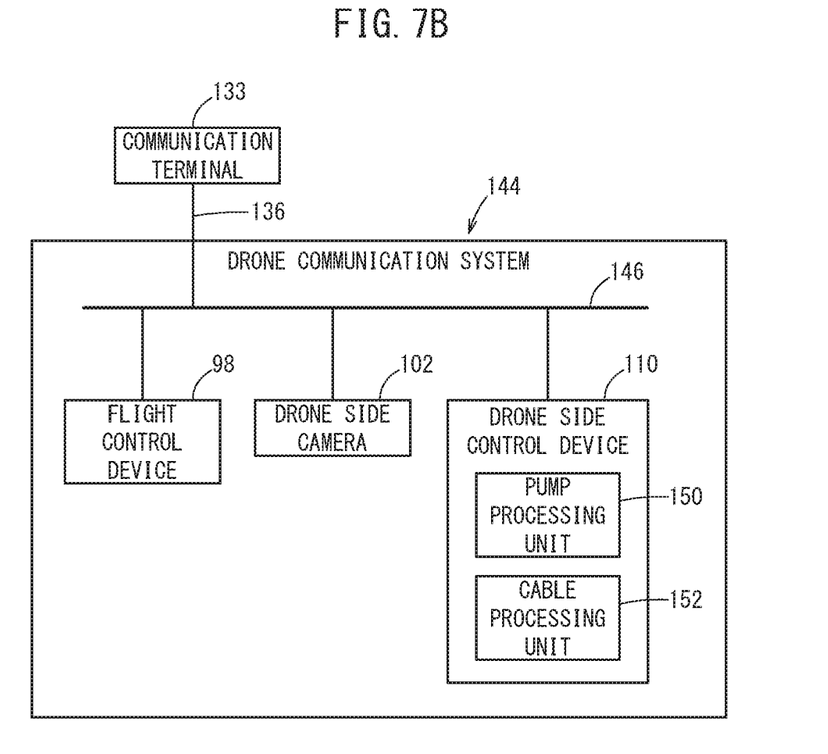
FIG. 7B is a block diagram illustrating a drone communication system.

As shown in FIG. 7A, the drone spraying agent system 142 is constituted from the sub-tank 106 that is connected to the spraying agent line 135, and the drone side pump 104 that is connected to the sub-tank 106. Further, as shown in FIG. 7B, in the drone communication system 144, the communication line 136 is connected to a bus 146 inside the drone 14, and the flight control device 98, the drone side camera 102, and the drone side control device 110, etc., are connected with respect to the bus 146. The flight control device 98, the drone side camera 102, and the drone side control device 110 are capable of communicating information mutually therebetween, and can carry out information communications with the station 12 and the other drone 14.

The drone side control device 110 of the drones 14 is configured as a computer having a processor, a memory, and an input/output interface, none of which are shown, and in conjunction with the flight control device 98, carries out spraying of the agricultural chemicals and adjustment of the length of the drone side cable 86. The drone side control device 110 and the flight control device 98 may be installed alongside one another on a single control substrate. Under execution of non-illustrated programs, the drone side control device 110 constructs a pump processing unit 150 that controls driving of the drone side pump 104, and a cable processing unit 152 that controls driving of the drone side cable mechanism 108.

Upon receiving an agricultural chemical spraying instruction (transmitted information) from the station 12, the pump processing unit 150 drives the drone side pump 104 and sprays the agricultural chemicals. For example, the pump processing unit 150 initiates spraying of the agricultural chemicals at a timing at which movement has taken place to a predetermined position on the basis of the flight information transmitted from the flight control device 98. Further, the pump processing unit 150 controls the degree to which the solenoid valve 104a of the drone side pump 104 opens, based on information concerning the amount of agricultural chemicals to be sprayed, and the spraying range included within the transmitted information.

The cable processing unit 152 controls driving of the drone side cable mechanism 108 on the basis of changes in the relative distance between the station 12 and the other drone 14, and performs a length adjustment control to adjust the length of the drone side cable 86 that extends from the second housing 92b.

By the length adjustment control, for example, the relative distance between the first drone 14A and the station 12 is calculated on the basis of the transmitted information from the station 12 and the flight information of the flight control device 98, and the target length of the drone side cable 86 is set. In addition, the cable processing unit 152 drives and controls the drone side cable mechanism 108 on the basis of the target length for the drone side cable 86. In the drive control, similar to winding of the station side cable 42 by the station side control device 22, a target rotational speed and a target position of the drone side motor 120 are calculated, and by comparing the actual rotational speed and the actual position of the drone side motor 120 therewith, rotation or stopping of rotation of the drone side motor 120 may be controlled. When the drones 14 are displaced, paying out and pulling in of the drone side cable 86 is performed in conjunction with the displacement speed.

In this instance, in addition to the length adjustment control, the drone side control device 110 (cable processing unit 152) is configured so as to execute a tension control so that the drones 14 themselves receive a constant tension from the drone side cable 86. This is because, if the tension of the drone side cable 86 fluctuates drastically, the drones 14 will be subjected to significant disturbances during flight, and it becomes difficult to control the attitude and position of the drones 14.

In the tension control, a signal is received from the encoder 126 and the current meter 128 provided in the drone side motor 120, and the actual tension $F_{act}$ received by the drone side motor 120 (drone side reel 122) is calculated. More specifically, based on a signal from the encoder 126, the cable processing unit 152 calculates the rotational speed and the rotational position (phase) of the drone side reel 122, and the angular velocity and the angular acceleration of the drone side motor 120.

In addition, the winding radius r is calculated on the basis of the rotational speed and the rotational position of the drone side reel 122, and a moment of inertia I is calculated on the basis of the winding radius r. The winding radius r is a distance from the axis of rotation of the drone side reel 122 to the outer circumferential surface of the drone side cable 86, in a state in which the drone side cable 86 is wound around the drone side reel 122.

Further, the cable processing unit 152 calculates the frictional resistance $T_n$ according to the following equation (5), based on the angular velocity ω of the drone side motor 120, and the coefficient of friction μ of the drone side motor 120 and the drone side reel 122.

$$T_n = \mu \omega \quad (5)$$

Furthermore, the cable processing unit 152 calculates the torque $T_b$ of the drone side motor 120 on the basis of the current value transmitted from the current meter 128. The cable processing unit 152 stores a torque-current map (not shown) in advance, and extracts the torque $T_b$ therefrom corresponding to the received current value.

After having calculated the winding radius r, the moment of inertia I, the frictional resistance $T_n$, and the torque $T_b$, the cable processing unit 152 calculates the actual tension $F_{act}$ received from the drone side cable 86 according to the following equation (6), $$F_{act} = (I\alpha + T_n + T_b)/r \quad (6)$$

where α represents the angular acceleration of the drone side motor 120.

Additionally, based on the calculated actual tension $F_{act}$ and the set target tension $F_{cmd}$, the cable processing unit 152 calculates a target current $I_m$ (i.e., the torque) of the drone side motor 120. More specifically, the difference E between the actual tension $F_{act}$ and the target tension $F_{cmd}$ is calculated, and from the difference E, the target current $I_m$ is calculated on the basis of a PID control in accordance with the following equation (7).

$$I_m = P \times E + I \int E dt + D dE/Dt \quad (7)$$

The drone side cable mechanism 108 (driver device) drives the drone side motor 120 on the basis of the target current $I_m$ calculated by the cable processing unit 152. At this time, the drone side cable mechanism 108 executes a feedback control based on the current value detected by the current meter 128, and drives the drone side motor 120 to rotate so as to follow the target current $I_m$.

Consequently, the drones 14 can appropriately control the length and tension of the drone side cables 86. For example, by adjusting the length of the drone side cable 86 of the second drone 14B between the first drone 14A and the second drone 14B, the relative position thereof can be easily set and changed.

The aerial spraying apparatus 11 (unmanned aerial vehicle system 10) and the drones 14 according to the present embodiment are basically configured in the manner described above. Next, operations thereof will be described.

When the agricultural chemicals are sprayed onto farmland, as shown in FIG. 2, the aerial spraying apparatus 11 connects the drone side external connector 114 of the drone side cable 86 of the first drone 14A to the station side external connector 56 of the station 12. Furthermore, as shown in FIG. 5, the drone side cable 86 of the second drone 14B is connected to the drone side cable 86 of the first drone 14A. Stated otherwise, as shown in FIG. 1, a wiring state is established in which the station 12, the first drone 14A, and the second drone 14B are connected in series in this order.

After having established such a wiring state, the station 12 supplies power from the power supplying unit 30 of the main body portion 20 to the first drone 14A and the second drone 14B via the station side cable 42 and the drone side cables 86. Consequently, the first drone 14A and the second drone 14B can be continuously driven over a prolonged time period, and furthermore, by not including batteries therein, the weight of the drones 14 is reduced.

Further, the station 12 carries out communication of information between the station side control device 22, the first drone 14A, and the second drone 14B via the station side cable 42 and the drone side cables 86. Stated otherwise, the first drone 14A and the second drone 14B can stably obtain information by wire concerning the flight position and spraying of the agricultural chemicals, and controls can suitably be performed in the respective drones 14 themselves.

Furthermore, the station 12 supplies the agricultural chemicals from the spraying agent supplying unit 32 of the main body portion 20 to the first drone 14A and the second drone 14B via the station side cable 42 and the drone side cables 86. Consequently, the first drone 14A and the second drone 14B are made capable of continuously spraying the agricultural chemicals. In particular, even though the first drone 14A and the second drone 14B include the sub-tanks 106 therein having a small volume, basically, the supplied agricultural chemicals can be sprayed without a large amount thereof being stored. Thus, it is possible to contribute to reducing the weight of the drones 14 themselves.

The aerial spraying apparatus 11 elongates the expanding/contracting pole 52 of the station 12, and arranges the station side external connector 56 at a sufficiently high position. In addition, when the agricultural chemicals are sprayed, the distance between the first and second drones 14A, 14B is properly set in a manner so that the spraying ranges of the agricultural chemicals of the first drone 14A and the second drone 14B do not overlap (or alternatively, overlap partially), and spraying is carried out therefrom simultaneously. Consequently, the aerial spraying apparatus 11 can efficiently spray the agricultural chemicals.

Further, in the case that the mutual relative positioning changes due to flying of the first drone 14A or movement of the station 12, the aerial spraying apparatus 11 performs paying out and winding in of the drone side cable 86 of the first drone 14A. At this time, as has been described above, the drone side control device 110 performs a length adjustment control and a tension control of the drone side cable 86. Stated otherwise, the first drone 14A adjusts the length of the drone side cable 86 while suppressing the tension of the drone side cable 86 acting between the first drone 14A and the station 12. Similarly, the second drone 14B adjusts the length while suppressing the tension of the drone side cable 86 acting between the second drone 14B and the first drone 14A. In accordance with this feature, even in the case of being connected by the drone side cables 86, the aerial spraying apparatus 11 can properly position the station 12, the first drone 14A, and the second drone 14B, and can suitably spray the agricultural chemicals.

In the aerial spraying apparatus 11, the unmanned aerial vehicle system 10, and the drones 14 according to the present embodiment having the configuration described above, the following effects are realized.

By being equipped with the drone side cable 86 and the drone side cable mechanism 108, and while being connected by wire to the station 12 on the ground or to the other drone 14, the drones 14 can fly suitably in the air and carry out operations. More specifically, the drones 14 can receive electrical power, agricultural chemicals, and information, etc., from the station 12 or another drone 14 via the drone side cable 86. Therefore, it is possible to reduce the time required for charging of electrical power, replenishment of the agricultural chemicals, and the like, and to continue with flying of the drones 14 themselves, and spraying of the agricultural chemicals for a prolonged time period. Further, when flying, the drone side cable mechanism 108 performs paying out or pulling in of the drone side cable 86 to thereby adjust the length of the drone side cable 86. Accordingly, an influence due to the drone side cable 86 being extended over a long length (entanglement of the drone side cable 86, contact with obstacles or the ground, load variations, or the like) is suppressed, and the drones 14 are capable of flying in a stable manner.

Further, the drone 14 (first drone 14A) is equipped with the drone side internal connector 124, which is capable of being connected with the drone side cable 86 of the other drone 14 (second drone 14B), whereby the wired connection with the other drone 14 can be performed easily.

In this instance, each of the drones 14 comprises the power supplying system 140 connected to the power terminal 131 provided in the drone side internal connector 124, and adapted to distribute electrical power supplied from the station 12, the spraying agent system 142 connected to the spraying agent terminal 132 provided in the drone side internal connector 124, and adapted to spray by the drone side pump 104 the spraying agent supplied from the station 12, and the communication system 144 connected to the communication terminal 133 provided in the drone side internal connector 124, and adapted to carry out communications with the station 12. Consequently, the drones 14 have a longer flight time, and the spraying agent is sprayed for a longer time period, and further, since the flight positions are adjusted highly accurately, the spraying agent can be sprayed efficiently.

Further, inside the drone side cable 86, there are accommodated collectively the electrical power line 111 connected to the power terminal 131, the spraying agent line 112 connected to the spraying agent terminal 132, and the communication line 113 connected to the communication terminal 133. In accordance with this feature, only one drone side cable 86 need be exposed to the exterior of the drone 14, and it is possible to prevent the drone side cable 86 from becoming caught on external obstacles, together with easily controlling paying out or pulling in of the cable.

Further still, on the free ends of the drone side cables 86 of the drones 14, the drone side external connectors 114 are provided, which are capable of being connected to the station 12 or to another drone 14. In accordance with this feature, the drones 14 are easily connected to the station 12 or to another drone 14, and the spraying agent and the like can be reliably supplied to the drones 14.

Furthermore, in the drones 14, by performing the tension control by the drone side control device 110, which causes the tension of the drone side cable 86 to be kept constant, it is possible to prevent the loads received from the drone side cable 86 from drastically fluctuating. In accordance with this feature, the drones 14 are capable of flying in a stable manner, even if the length of the drone side cable 86 is adjusted during flight.

In this case, the drone side cable mechanism 108 comprises the drone side reel 122 on which the drone side cable 86 is wound, and the drone side motor 120 that rotates the drone side reel 122, and during implementation of the tension control, the drone side control device 110 may calculate an actual tension on the basis of the winding radius, the moment of inertia, and the frictional resistance of the drone side reel 122, and a torque of the drone side motor 120, and may further control driving of the drone side motor 120 by calculating a target current of the drone side motor 120 based on the actual tension and the target tension. Consequently, even in the event that the drone side cable 86 is paid out or is pulled in, the tension of the drone side cable 86 can be stabilized in a smooth manner.

In addition, in the aerial spraying apparatus 11, since the station 12 includes the power supplying unit 30 that supplies electrical power to one or more drones 14, there is no need to provide batteries or the like on the side of the drones 14, and it is possible to reduce the weight of the drones 14.

Since the station 12 has the height adjusting unit 46 that displaces the height position of the station side external connector 56, it is possible to connect the drone side cable 86 thereto at a sufficiently high position. Consequently, it is possible to more reliably prevent the drone side cable 86 from coming into contact with obstacles or the ground.

In this case, by the station side cable 42 and the station side cable mechanism 50, it is possible for the station 12 to easily transmit electrical power and the agricultural chemicals from the power supplying unit 30 and the spraying agent supplying unit 32 to the station side external connector 56.

In addition, by the expanding/contracting pole 52 and the station side control device 22, the station 12 can easily adjust the height position of the station side external connector 56.

In addition to the above-described configuration, the station side control device 22 performs a pulling in control depending on the contraction of the expanding/contracting pole 52, whereby the station side cable 42 can be retracted in a suitable manner while preventing entanglement of the station side cable 42.

Still further, since the station 12 is constituted as a movable body 16 that is capable of moving on the ground, it is possible for the aerial spraying apparatus 11 to be moved, for example, when the agricultural chemicals are sprayed by the drones 14. Consequently, the spraying range of the agricultural chemicals can be further widened.

The present invention is not limited to the above-described embodiment, and various modifications are possible in line with the essence and gist of the invention. For example, the unmanned aerial vehicle system 10 is not limited to being an aerial spraying apparatus 11 that sprays agricultural chemicals from the drones 14, and can be applied to various uses. As spraying agents to be sprayed by the aerial spraying apparatus 11, apart from agricultural chemicals, there may be cited spraying of an insect repellent, a fire retardant, water, or the like.

Further, due to the fact that the flying time in the air can be obtained sufficiently by wire, for example, the unmanned aerial vehicle system 10 may be configured as a system that carries out a search, and captures images and the like within regions in which it is difficult for people to enter. For example, it is possible to perform operations efficiently by flying in a formation in which a plurality of the unmanned aerial vehicles are arranged in a row. In this case, the station side cable 42 and the drone side cable 86 may be configured in a manner so as to carry out supply of electrical power and communication of information.

Furthermore, the aerial spraying apparatus 11 (unmanned aerial vehicle system 10) may be configured in a manner to carry out a predetermined operation by one drone 14, and not only by performing a predetermined operation (spraying of agricultural chemicals) by a plurality of drones 14. Even in such a case, by properly adjusting the drone side cable 86, which bridges between the station 12 and the drone 14, entanglement of the drone side cable 86 can be suppressed.

Still further, the unmanned aerial vehicle system 10 may be of a configuration in which a plurality of drones 14 are connected in parallel to the station 12. For example, the plurality of drones 14 may fly in mutually different directions about the center of the station 12, and may spray the agricultural chemicals within a spraying range of such directions. Further still, the station 12 may be constituted by an immovable facility on the ground or the like.

What is claimed is:

1. An aerial spraying apparatus including one or more unmanned aerial vehicles adapted to fly in the air by remote operation or by automated piloting, and a station on the ground that is in communication with at least one of the one or more unmanned aerial vehicles, wherein:
    the station includes a spraying agent supplying unit that includes a storage tank and a station side pump and is capable of supplying a spraying agent; and
    the one or more unmanned aerial vehicles comprises:
    an unmanned aerial vehicle side cable connected to the station and another unmanned aerial vehicle that constitutes the one or more unmanned aerial vehicles;
    a cable mechanism that includes an unmanned aerial vehicle side motor, a drone side reel, and an unmanned aerial vehicle side internal connector and is adapted to perform paying out or pulling in of a station side cable; and
    a spraying unit that includes an unmanned aerial vehicle side pump, a valve, and a nozzle and is adapted to spray the spraying agent,
    wherein the at least one of the one or more unmanned aerial vehicles is connected to the station by the unmanned aerial vehicle side cable, the spraying agent is supplied from the spraying agent supplying unit to the at least one of the one or more unmanned aerial vehicles via the unmanned aerial vehicle cable,
    the spraying agent is supplied from the at least one of the one or more unmanned aerial vehicles to the another unmanned aerial vehicle via the unmanned aerial vehicle side cable extending between the unmanned aerial vehicles,
    the spraying agent is sprayed from the one or more unmanned aerial vehicles,
    the station includes a height adjusting unit that includes an expanding/contracting pole that adjusts a connection height position of the unmanned aerial vehicle side cable connected to the station, and
    the station side cable is accommodated inside the expanding/contracting pole.

2. The aerial spraying apparatus according to claim 1, wherein:
    the one or more unmanned aerial vehicles includes a housing in which the unmanned aerial vehicle side cable is accommodated; and
    inside the housing, an unmanned aerial vehicle side internal connector is provided which is capable of being connected to the unmanned aerial vehicle side cable of the another unmanned aerial vehicle.

3. The aerial spraying apparatus according to claim 2, wherein the one or more unmanned aerial vehicles comprises:
    a power supplying system that is connected to a power terminal provided in the unmanned aerial vehicle side internal connector, and includes a power distribution unit adapted to distribute electrical power supplied from the station to components inside the one or more unmanned aerial vehicles;
    a spraying agent system that includes a sub-tank connected to a spraying agent line through a spraying agent terminal provided in the unmanned aerial vehicle internal connector, and an unmanned aerial vehicle side pump connected to the sub-tank and that is adapted to spray by the unmanned aerial vehicle side pump the spraying agent supplied from the station; and
    a communication system that includes a bus, is connected, through a communication line connected to the bus, to a communication terminal provided in the unmanned aerial vehicle side internal connector, and is adapted to carry out communications with the station.

4. The aerial spraying apparatus according to claim 3, wherein inside the unmanned aerial vehicle side cable and the station side cable, there are accommodated collectively an electrical power line connected to the power terminal, a spraying agent line connected to the spraying agent terminal, and a communication line connected to the communication terminal.

5. The aerial spraying apparatus according to claim 1, wherein an unmanned aerial vehicle side external connector, which is capable of being connected to the station or the another unmanned aerial vehicle, is provided at a free end portion of the unmanned aerial vehicle side cable of the one or more unmanned aerial vehicles.

6. The aerial spraying apparatus according to claim 1, wherein the one or more unmanned aerial vehicles includes an unmanned aerial vehicle side control device that includes an unmanned aerial vehicle side computer including a processor, a memory, and an input/output interface and is adapted to carry out a tension control for keeping a tension of the unmanned aerial vehicle side cable constant during paying out or pulling in of the unmanned aerial vehicle side cable by the cable mechanism.

7. The aerial spraying apparatus according to claim 6, wherein:
the cable mechanism comprises a reel on which the unmanned aerial vehicle side cable is wound, and a motor adapted to rotate the reel; and
during implementation of the tension control, the unmanned aerial vehicle side control device calculates an actual tension on the basis of a winding radius, a moment of inertia, and a frictional resistance of the reel, and a torque of the motor, and further controls driving of the motor by calculating a target current of the motor based on the actual tension and a target tension.

8. The aerial spraying apparatus according to claim 1, wherein the station comprises
a power supplying unit that includes a generator or a battery, and an electrical device that controls an electrical power state of the generator or the battery and is adapted to supply electrical power via the station side cable and the unmanned aerial vehicle side cable to the one or more unmanned aerial vehicles.

9. The aerial spraying apparatus according to claim 1, wherein the station comprises:
a station side external connector to which the station side cable and the unmanned aerial vehicle side cable is connected; and
the height adjusting unit that further includes an actuator carrying out expansion and contraction operations of the expanding/contracting pole and is adapted to displace a height position of the station side external connector.

10. The aerial spraying apparatus according to claim 9, wherein the station further comprises:
the station side cable connected to the station side external connector; and
a station side cable mechanism that includes a motor, a reel, a station side internal connector and is adapted to perform pulling in of at least the station side cable.

11. The aerial spraying apparatus according to claim 10, wherein:
the height adjusting unit includes the expanding/contracting pole having the station side external connector provided on an upper end portion thereof, and which is capable of being vertically expanded and contracted; and
the station includes a station side control device that includes a computer including a processor, a memory, and an input/output interface and is adapted to control an amount of expansion or contraction of the expanding/contracting pole.

12. The aerial spraying apparatus according to claim 11, wherein the station side control device performs the pulling in control to pull in the station side cable by the station side cable mechanism, depending on a contraction of the expanding/contracting pole.

13. The aerial spraying apparatus according to claim 1, wherein the station is constituted as a movable body that is capable of moving on the ground.

14. The aerial spraying apparatus according to claim 1, wherein a station side external connector and an unmanned aerial vehicle side external connector are disk-shaped and are connected to each other.

15. An unmanned aerial vehicle system including one or more unmanned aerial vehicles adapted to fly in the air by remote operation or by automated piloting, and a station on the ground that is in communication with at least one of the one or more unmanned aerial vehicles;
wherein the one or more unmanned aerial vehicles comprises:
an unmanned aerial vehicle side cable connected to the station and another unmanned aerial vehicle that constitutes the one or more unmanned aerial vehicles; and
a cable mechanism that includes an unmanned aerial vehicle side motor, an unmanned aerial vehicle side reel, and an unmanned aerial vehicle side internal connector and is adapted to perform paying out or pulling in of the unmanned aerial vehicle side cable,
the station includes a height adjusting unit that includes an expanding/contracting pole that adjusts a connection height position of the unmanned aerial vehicle side cable connected to the station, and
a station side cable is accommodated inside the expanding/contracting pole.

16. The unmanned aerial vehicle system according to claim 15, wherein a station side external connector and an unmanned aerial vehicle side external connector are disk-shaped and are connected to each other.

17. An unmanned aerial vehicle adapted to fly in the air by remote operation or by automated piloting, comprising:
an unmanned aerial vehicle side communication cable connected with respect to a station on the ground and another unmanned aerial vehicle; and
a cable mechanism that includes an unmanned aerial vehicle side motor, an unmanned aerial vehicle side reel, and an unmanned aerial vehicle side internal connector, and is adapted to perform paying out or pulling in of the unmanned aerial vehicle side cable,
wherein the station includes a height adjusting unit that includes an expanding/contracting pole that adjusts a connection height position of the unmanned aerial vehicle side cable connected to the station, and
a station side cable is accommodated inside the expanding/contracting pole.

18. The unmanned aerial vehicle according to claim 17, wherein a station side external connector and an unmanned aerial vehicle side external connector are disk-shaped and are connected to each other.

* * * * *